(No Model.)
A. EGGERS.
MIXING AND SHAKING CUP.
No. 263,394. Patented Aug. 29, 1882.
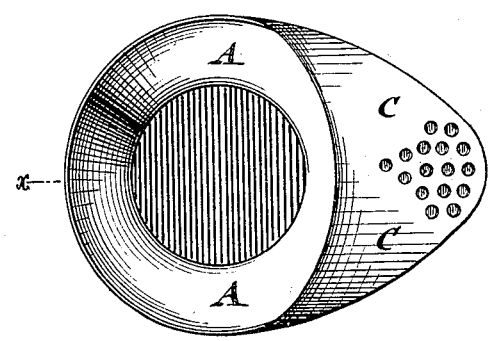
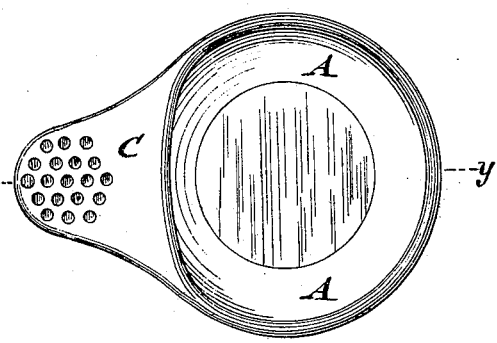
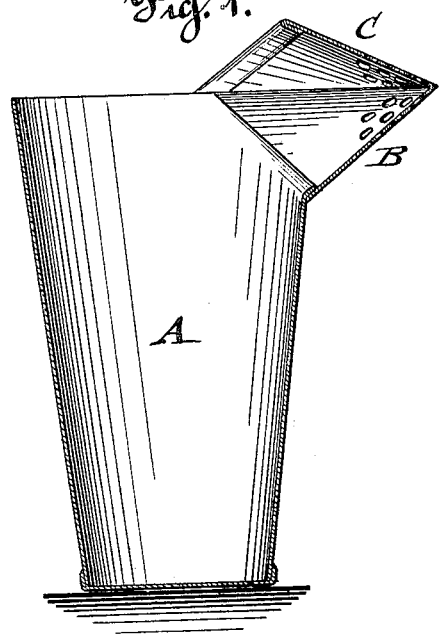
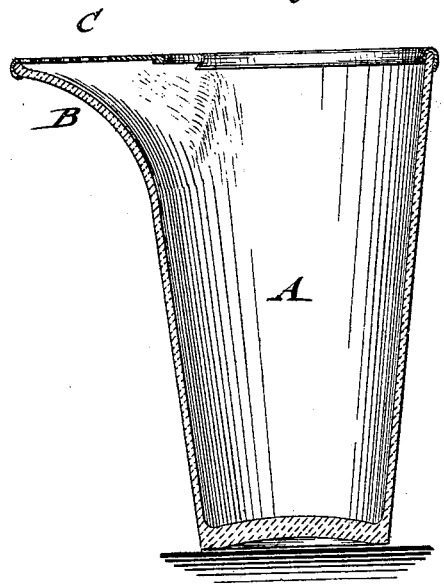
WITNESSES:
INVENTOR
Anton Eggers
BY Paul Goepel.
ATTORNEY

UNITED STATES PATENT OFFICE.

ANTON EGGERS, OF NEW YORK, N. Y.

MIXING AND SHAKING CUP.

SPECIFICATION forming part of Letters Patent No. 263,394, dated August 29, 1882.

Application filed May 22, 1882. (No model.)

*To all whom it may concern:*

Be it known that I, ANTON EGGERS, of the city, county, and State of New York, have invented certain new and useful Improvements in Mixing and Shaking Cups, of which the following is a specification.

This invention relates to an improved mixing and shaking cup to be used by barkeepers in preparing mixed drinks; and the invention consists of a conical mixing and shaking cup having a spout with a convex perforated cover, the inner edge of which is of concave arc shape to admit the insertion of a second inverted cup.

In the accompanying drawings, Figures 1 and 2 represent respectively a vertical central section and a top view of my improved mixing and shaking cup, and Figs. 3 and 4 are a vertical transverse section and a top view of a modified form of the same.

Similar letters of reference indicate corresponding parts.

A in the drawings represents a conical mixing-cup of sheet metal, glass, or other suitable material, which is provided with a plain or perforated spout, B. The spout B is well set out from the conical cup A, and has a convex perforated cover, C, that is soldered to the spout B of the cup A when the latter is made of sheet metal. The inner edge of the cover C is made of concave arc shape, so as to admit an inverted cup or glass inside of the cup when required to shake a mixed drink. The spout B may be made integral with the cup A, when the same is made of glass, in which case the spout-cover C is attached thereto by means of a metallic rim and a suitable cement, as shown in Figs. 3 and 4. The covered spout B C of the mixing-cup A serves as a strainer, as the beverage mixed and prepared therein may be readily run off through the perforations of the same.

Thus a mixing and shaking cup for preparing mixed drinks is furnished that facilitates the preparation of these beverages and admits their quick and convenient straining off without a separate straining device.

Having thus described my invention, I claim as new and desire to secure by Letters Patent—

1. A mixing and shaking cup provided with a spout and a perforated spout-cover, substantially as set forth.

2. A mixing and shaking cup having a perforated spout and a convex perforated spout-cover, substantially as specified.

3. A mixing and shaking cup having a spout and a convex perforated spout-cover, the inner edge of which is made of concave arc shape, substantially as specified.

In testimony that I claim the foregoing as my invention I have signed my name in presence of two subscribing witnesses.

ANTON EGGERS.

Witnesses:
PAUL GOEPEL,
SIDNEY MANN.